US012644532B2

(12) United States Patent
Jeong et al.

(10) Patent No.: US 12,644,532 B2
(45) Date of Patent: Jun. 2, 2026

(54) FLUID CONTROL DEVICE

(71) Applicants: Hyundai Motor Company, Seoul
(KR); Kia Corporation, Seoul (KR)

(72) Inventors: Pu Reum Jeong, Suncheon-Si (KR);
Hyeon Seok Ban, Yongin-Si (KR)

(73) Assignees: Hyundai Motor Company;, Seoul
(KR); Kia Corporation, Seoul (KR)

( * ) Notice: Subject to any disclaimer, the term of this
patent is extended or adjusted under 35
U.S.C. 154(b) by 5 days.

(21) Appl. No.: 18/793,648

(22) Filed: Aug. 2, 2024

(65) Prior Publication Data

US 2025/0215993 A1     Jul. 3, 2025

(30) Foreign Application Priority Data

Dec. 28, 2023     (KR) ........................ 10-2023-0195672

(51) Int. Cl.
*F16K 31/06* (2006.01)
*H01M 8/04119* (2016.01)
(52) U.S. Cl.
CPC ...... *F16K 31/0651* (2013.01); *F16K 31/0655*
(2013.01); *H01M 8/04179* (2013.01)
(58) Field of Classification Search
CPC ............. F16K 31/0651; F16K 31/0655; F16K
31/0672; F16K 27/029; H01M 8/04179
See application file for complete search history.

(56) References Cited

U.S. PATENT DOCUMENTS

| | | | | |
|---|---|---|---|---|
| 2,322,911 A | * | 6/1943 | Beam | .................. F16K 31/0679 |
| | | | | 251/129.1 |
| 3,043,336 A | * | 7/1962 | Parent | ................ F16K 31/0627 |
| | | | | 137/625.5 |
| 4,579,146 A | * | 4/1986 | Tsuru | ...................... B60T 8/364 |
| | | | | 303/119.2 |
| 6,026,860 A | * | 2/2000 | Teichmann | ............. F16K 31/06 |
| | | | | 251/129.1 |
| 9,915,360 B2 | * | 3/2018 | Siméon | ................. F16K 11/056 |
| 10,655,748 B2 | * | 5/2020 | Ho | ....................... F16K 31/0651 |
| 2022/0146011 A1 | * | 5/2022 | Park | .................... F16K 31/0651 |

FOREIGN PATENT DOCUMENTS

KR     10-2025-0100257 A     7/2025

* cited by examiner

*Primary Examiner* — Eric Keasel
(74) *Attorney, Agent, or Firm* — MORGAN, LEWIS &
BOCKIUS LLP

(57)     ABSTRACT

A fluid control device includes a housing portion including
an inlet port and an outlet port, and a valve portion fixedly
coupled to an internal surface of the housing portion, in
which the valve portion includes a lower plunger module, an
upper plunger module, an elastic member including one side
configured to press the lower plunger module downward and
the other side configured to press the upper plunger module
upward, and a solenoid, in which the lower plunger module
includes a lower plunger member movable in an upward/
downward direction H, and in which the upper plunger
module includes an upper plunger member provided to be
movable in the upward/downward direction H relative to the
housing portion, and a core provided to be penetrated by a
partial region of the upper plunger member and including at
least a partial region surrounded by the solenoid.

20 Claims, 9 Drawing Sheets

10

FLUID CONTROL DEVICE

CROSS-REFERENCE TO RELATED APPLICATION

The present application claims priority to Korean Patent Application No. 10-2023-0195672 filed on Dec. 28, 2023, the entire contents of which is incorporated herein for all purposes by this reference.

BACKGROUND OF THE PRESENT DISCLOSURE

Field of the Present Disclosure

The present disclosure relates to a fluid control device, and more particularly, to a fluid control device capable of controlling a fluid discharged from a fuel cell.

Description of Related Art

A fuel processing system (FPS) serves to supply air, which is fuel, to a fuel cell and to discharge condensate water and hydrogen-containing gas that are discharged from the fuel cell. In addition to the fuel cell, the FPS is generally equipped with a water trap configured to store condensate water discharged from the fuel cell, a discharge valve configured to discharge the condensate water stored in the water trap, a level sensor configured to measure a level of the condensate water in the water trap, and a purge valve configured to discharge gas discharged from the fuel cell. Among these components, the purge valve performs control to rapidly discharge the gas in the fuel cell to the outside so that a concentration of hydrogen is within an appropriate range in a fuel electrode in the fuel cell.

Meanwhile, recently, studies have been conducted to reduce the costs of the FPS and simplify the configuration of the FPS by eliminating the level sensor and the purge valve. However, in the instant case, because it is impossible to directly measure a flow rate of the gas purged from the fuel cell in the FPS, there is a need for a technology capable of estimating a flow rate of the purged gas.

However, generally, the technology, which estimates the flow rate of the purged gas, is greatly affected by a method of supplying hydrogen, and there is a limitation in terms of accuracy in estimating the flow rate. For example, generally, a method of using a pressure at a front end of a nozzle and a pressure at a rear end of the nozzle provided in a supply line for hydrogen has been used to estimate a flow rate of the purged gas. However, there is a problem in that the present estimation method cannot be used for a case in which liquid hydrogen is supplied to the FPS.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a new type of fluid control device including a structure configured for directly measuring a flow rate of purged gas regardless of a method of supplying hydrogen.

To achieve the above-mentioned object, one aspect of the present disclosure provides a fluid control device including:

a housing portion including an inlet port through which a fluid is introduced from an outside of the housing portion, an outlet port through which the fluid is discharged to the outside of the housing portion, and an internal space configured to fluidically-communicate with the inlet port and the outlet port; and a valve portion accommodated in the internal space of the housing portion and including one side fixedly coupled to an internal surface of the housing portion, in which the valve portion includes: a lower plunger module; an upper plunger module provided above the lower plunger module; and a solenoid provided to surround a partial region of the upper plunger module and a partial region of the lower plunger module, in which the lower plunger module includes a lower plunger member movable in a first direction relative to the housing portion, and in which the upper plunger module includes: an upper plunger member movable in the first direction relative to the housing portion and including at least a partial region surrounded by the solenoid; and a core including at least a partial region surrounded by the solenoid.

The valve portion may further include an elastic member mounted between the lower plunger module and the upper plunger module and including a first side pressing the lower plunger module downward, and a second side pressing the upper plunger module upwards.

The fluid control device may further include: a bobbin portion fixedly coupling the lower plunger module, the upper plunger module, and the solenoid to the internal surface of the housing portion, in which the bobbin portion includes: a bobbin body region to which the lower plunger module is attached, the bobbin body region being opened at an upper side thereof and fixedly coupled to the internal surface of the housing portion; and a bobbin cover region to which the upper plunger module is attached, the bobbin cover region being coupled to an upper portion of the bobbin body region and fixedly coupled to the internal surface of the housing portion.

The fluid control device may further include: a valve casing attached to an internal surface of the bobbin body region and accommodating the solenoid and the core therein.

A lower surface of an upper region of the valve casing may be attached to the solenoid and the core, and the upper plunger member may include: an upper plunger body region disposed above the valve casing; and an upper plunger extension region extending downwardly from the upper plunger body region and penetrating the upper region of the valve casing and the core.

The elastic member may be a spring, and the spring may be provided to surround a periphery of a section of the upper plunger extension region that protrudes downwardly from the core.

At least a portion of the section of the upper plunger extension region, which protrudes downwardly from the core, may be fixedly coupled to the lower plunger member.

The lower plunger module may further include a yoke member mounted between the valve casing and the lower plunger member, and the yoke member may include: a yoke body region surrounding an external periphery of the lower plunger member and penetrating a lower region of the valve casing; and a yoke extension region extending in a second direction from a lower end portion of the yoke body region and attached to the lower region of the valve casing.

The upper plunger module may further include an upper diaphragm to which the upper plunger body region is fixedly coupled, the upper diaphragm mounted above the valve casing and including an end portion defined based on a second direction and attached to the bobbin cover region.

A region of the upper diaphragm, to which the upper plunger body region is fixedly coupled, may be provided to be movable in the upward/downward direction H.

The upper diaphragm may include a shape convex upwards.

The upper plunger module may further include an upper support plate attached to an upper surface of the upper region of the valve casing and an internal surface of the upper diaphragm and supporting a peripheral region of a region of the upper diaphragm to which the upper plunger body region is fixedly coupled.

The lower plunger module may further include a lower diaphragm to which the lower plunger member is fixedly coupled, the lower diaphragm being mounted below the valve casing and including an end portion defined based on the horizontal direction W and attached to the bobbin body region.

A region of the lower diaphragm, to which the lower plunger member is fixedly coupled, may be provided to be movable in the upward/downward direction H.

The lower diaphragm may include a shape convex downward.

The lower plunger module may further include a lower support plate attached to a lower surface of the yoke extension region and an internal surface of the lower diaphragm and supporting a peripheral region of a region of the lower diaphragm to which the lower plunger member is fixedly coupled.

The lower plunger member and the core may include a magnetic material.

The yoke member may include a magnetic material.

A degree of magnetization of a material forming the upper plunger member may be lower than a degree of magnetization of a material forming the lower plunger member and a degree of magnetization of a material forming the core.

The core may include: a core body region attached to a lower surface of an upper region of the valve casing; and a downward protrusion region extending downwardly from the core body region and surrounding an external periphery of at least a partial region of the lower plunger member.

A lower end portion of the downward protrusion region may include a pointy vertical cross-sectional shape.

The housing portion may include an inlet protrusion region protruding downwardly from a lower surface of an upper region of the housing portion and configured to interfere with the upper diaphragm in a state that the upper diaphragm moves upward with a predetermined distance, and the inlet protrusion region may be formed along a periphery of the inlet port.

The housing portion may include an outlet protrusion region protruding upwards from an upper surface of a lower region of the housing portion and configured to interfere with the lower diaphragm in a state that the lower diaphragm moves downward with a predetermined distance, and the outlet protrusion region may be formed along a periphery of the outlet port.

A lower surface of the core body region and an upper end portion of the lower plunger member may be spaced from each other in the first direction.

A vent hole, which is formed through the housing portion and the bobbin body region, may be formed in a portion of a region in which the housing portion and the bobbin body region are attached to each other.

The fluid control device may further include: a pressure sensor provided at one side of the housing portion and configured for measuring a pressure in the internal space of the housing portion, in which the pressure sensor may be provided above an upper end portion of the outlet protrusion region.

To achieve the above-mentioned object, another aspect of the present disclosure provides a method of controlling the fluid control device, the method including: an outlet port sealing step in which in a state in which no electric current flows to the solenoid, the lower plunger module is attached to a lower region of the housing portion to seal the internal space of the housing portion from the outlet port, and the upper plunger module is spaced from an upper region of the housing portion; an inlet port sealing step in a state in which a first electric current flows to the solenoid, the upper plunger module moves to the upper region of the housing portion to seal the internal space of the housing portion from the inlet port, and the lower plunger module is spaced from the lower region of the housing portion; and a simultaneous opening step in a state in which a second electric current lower than the first electric current flows to the solenoid, the lower plunger module is spaced from the lower region of the housing portion in a state in which the upper plunger module is spaced from the upper region of the housing portion so that the inlet port, the outlet port, and the internal space of the housing portion fluidically-communicate with one another.

The inlet port of the fluid control device may be connected to a fuel cell, and in the outlet port sealing step, hydrogen-containing gas and condensate water, which are discharged from the fuel cell, may be introduced into the internal space of the housing portion through the inlet port.

In the inlet port sealing step, the condensate water may begin to be discharged first between among the hydrogen-containing gas and the condensate water stored in the housing portion.

The method may further include: a purge flow rate calculation step in which a change in pressure over time in the housing portion, in which the inlet port sealing step is performed, is measured, and the amount of gas and condensate water, which are discharged from an interior of the housing portion in the inlet port sealing step, is calculated based on a time point at which a rate (dP/dt) of change in pressure over time in the housing portion exceeds a predetermined magnitude in a state that the dP/dt exceeds the predetermined magnitude.

According to an exemplary embodiment of the present disclosure, it is possible to provide the new type of fluid control device including the structure configured for directly measuring the flow rate of the purged gas regardless of the method of supplying hydrogen.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
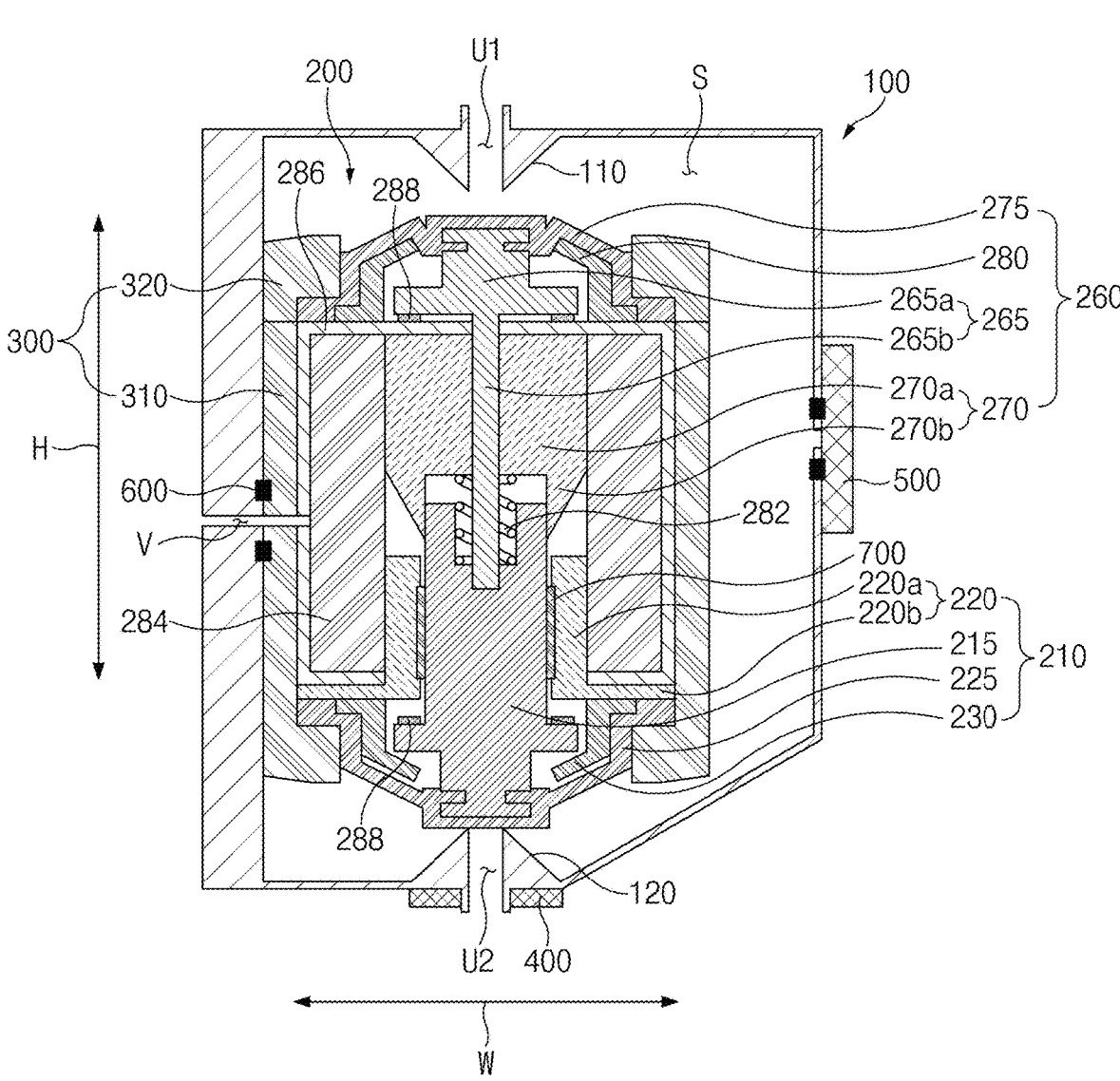
FIG. 1 is a view exemplarily illustrating a cross-sectional structure of a fluid control device according to an exemplary embodiment of the present disclosure and illustrating a state in which a valve part opens an inlet port of the fluid control device and closes an outlet port of the fluid control device.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be calculated in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a fluid control device according to an exemplary embodiment of the present disclosure will be described with reference to the drawings.

Fluid Control Device

Figure 2:
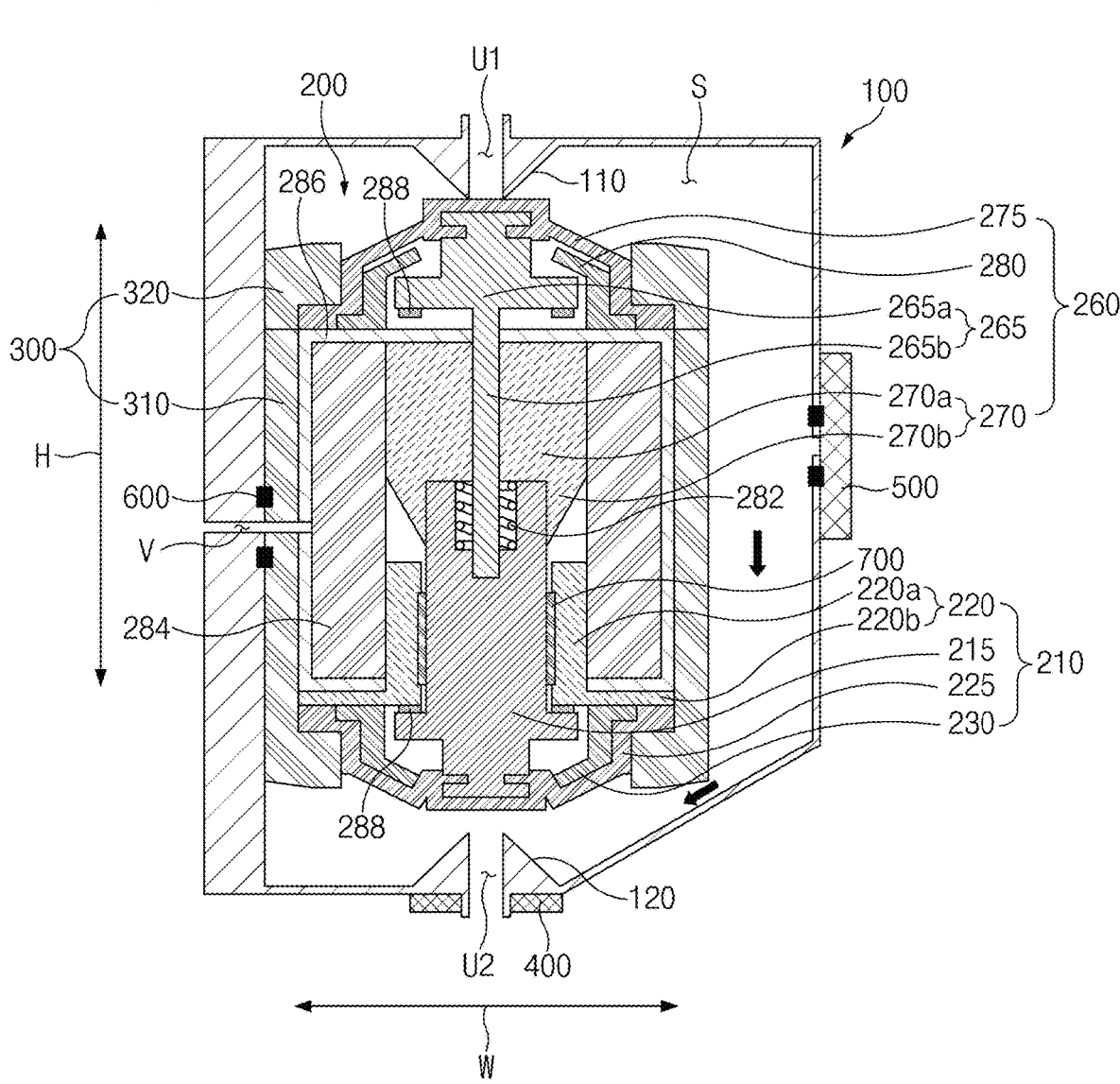
FIG. 2 is a view exemplarily illustrating a cross-sectional structure of the fluid control device according to an exemplary embodiment of the present disclosure and illustrating a state in which the valve part closes the inlet port of the fluid control device and opens the outlet port of the fluid control device.
Figure 3:
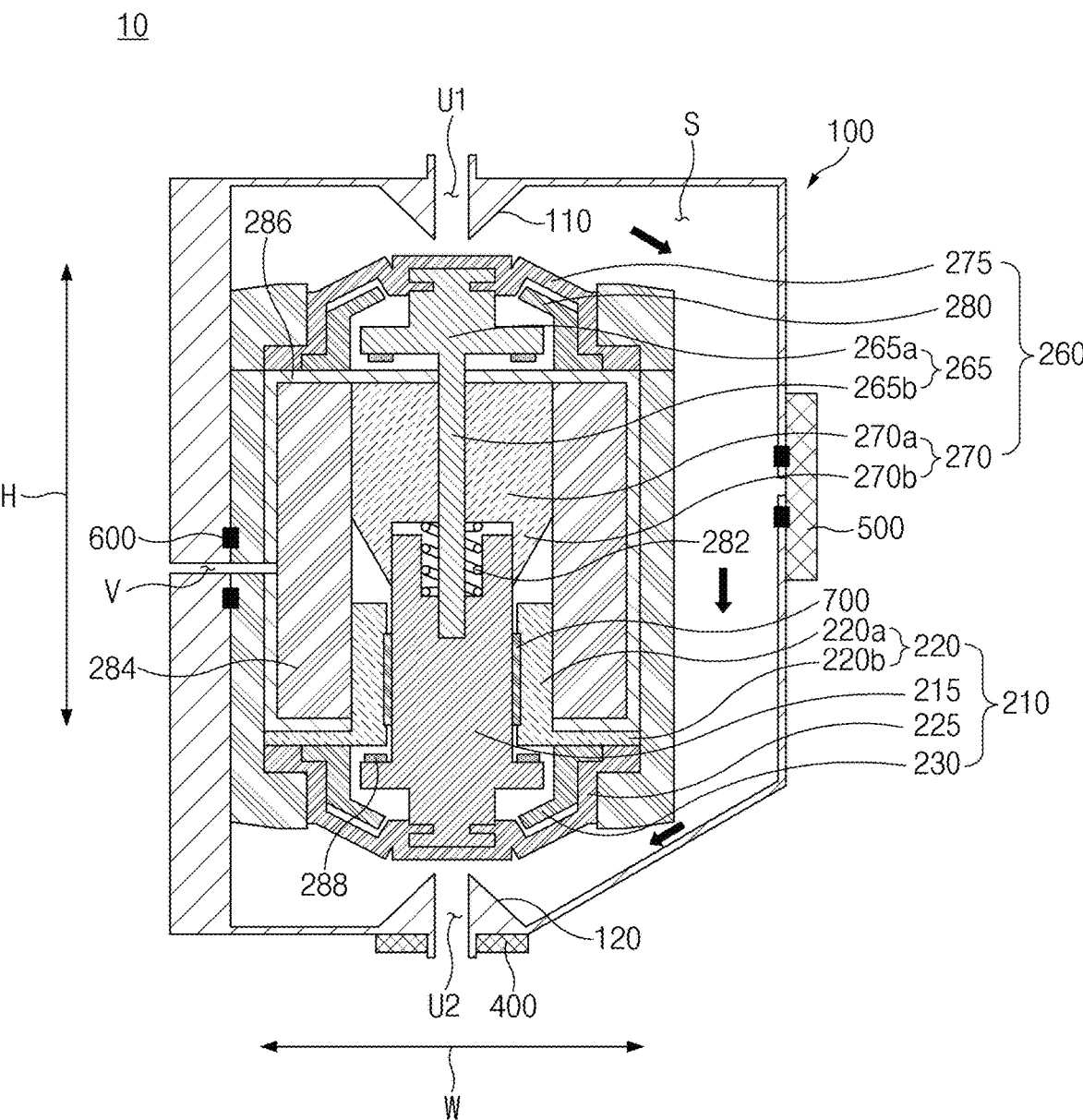
FIG. 3 is a view exemplarily illustrating a cross-sectional structure of the fluid control device according to an exemplary embodiment of the present disclosure and illustrating a state in which the valve part opens the inlet and outlet ports of the fluid control device.

FIG. 1 is a view exemplarily illustrating a cross-sectional structure of a fluid control device according to an exemplary embodiment of the present disclosure and illustrating a state in which a valve portion opens an inlet port of the fluid control device and closes an outlet port of the fluid control device, and FIG. 2 is a view exemplarily illustrating a cross-sectional structure of the fluid control device according to an exemplary embodiment of the present disclosure and illustrating a state in which the valve portion closes the inlet port of the fluid control device and opens the outlet port of the fluid control device. FIG. 3 is a view exemplarily illustrating a cross-sectional structure of the fluid control device according to an exemplary embodiment of the present disclosure and illustrating a state in which the valve portion opens the inlet and outlet ports of the fluid control device.

A fluid control device 10 according to an exemplary embodiment of the present disclosure may be connected to a fuel cell and configured to introduce condensate water and hydrogen-containing gas, which are discharged from the fuel cell, and discharge the condensate water and the gas to the outside thereof. The fluid control device 10 according to an exemplary embodiment of the present disclosure may be a new type of fluid control device including a structure in which a function of a condensate water discharge valve, which discharges condensate water discharged from a fuel cell, and a function of a purge valve, which purges hydrogen-containing gas to the outside to control a concentration of hydrogen in a fuel electrode of the fuel cell, are integrated. According to an exemplary embodiment of the present disclosure, the single device may be used to discharge both the condensate water and the hydrogen-containing gas, which simplifies an overall structure of a system including the fuel cell.

With reference to FIG. 1, FIG. 2, and FIG. 3, the fluid control device 10 according to an exemplary embodiment of the present disclosure may include a housing portion 100 including an inlet port U1 through which a fluid is introduced from the outside thereof, an outlet port U2 through which the fluid is discharged to the outside thereof, and an internal space S to fluidically-communicate with the inlet port U1 and the outlet port U2. For example, the inlet port U1 may be provided in an upper region of the housing portion 100, and the outlet port U2 may be provided in a lower region of the housing portion 100. In case that the fluid control device 10 is connected to the fuel cell as described above, the condensate water and the hydrogen-containing gas, which are discharged from the fuel cell, may be introduced into the internal space S of the housing portion 100 through the inlet port U1. Furthermore, the condensate water and the hydrogen-containing gas introduced into the internal space S of the housing portion 100 may be discharged to the outside through the outlet port U2.

The fluid control device 10 according to an exemplary embodiment of the present disclosure may further include a valve portion 200 accommodated in the internal space S of the housing portion 100 and including one side fixedly coupled to an internal surface of the housing portion 100. The valve portion 200 may be configured to control a flow of the condensate water and a flow of the gas by adjusting degrees to which the inlet port U1 and the outlet port U2 are opened or closed.

The valve portion 200 may include a lower plunger module 210 and an upper plunger module 260 provided above the lower plunger module 210. As illustrated in FIG. 1, FIG. 2, and FIG. 3, the lower plunger module 210 may be disposed in a lower region of the internal space S, and the upper plunger module 260 may be disposed in an upper region of the internal space S.

The upper plunger module 260 may be configured to control an operation of opening or closing the inlet port U1 of the housing portion 100, and the lower plunger module 210 may be configured to control an operation of opening or closing the outlet port U2 of the housing portion 100. To the present end, some of the components of the upper plunger module 260 may be provided to be movable in a direction toward the inlet port U1 and a direction away from the inlet port U1, i.e., in an upward/downward direction H. Some of the components of the lower plunger module 210 may be provided to be movable in a direction toward the outlet port U2 and a direction away from the outlet port U2, i.e., in the upward/downward direction H.

The lower plunger module 210 may include a lower plunger member 215 configured to be movable in the upward/downward direction H relative to the housing portion 100, and the upper plunger module 260 may include an upper plunger member 265 configured to be movable in the upward/downward direction H relative to the housing portion 100. According to an exemplary embodiment of the present disclosure, the outlet port U2 may be closed with respect to the internal space S when the lower plunger member 215 moves downward with a predetermined distance, and the inlet port U1 may be closed with respect to the internal space S when the upper plunger member 265 moves upward with a predetermined distance.

With continued reference to FIG. 1, FIG. 2, and FIG. 3, the fluid control device 10 may further include an elastic member 282 provided between the lower plunger module 210 and the upper plunger module 260 and configured so that one side of the elastic member 282 presses the lower plunger module 210 downward and the other side of the elastic member 282 presses the upper plunger module 260 upwards. Furthermore, the fluid control device 10 may further include a solenoid 284 provided to surround a partial region of the upper plunger module 260 and a partial region of the lower plunger module 210.

The solenoid 284 may be configured to be supplied with an electric current from the outside thereof. When the electric current flows to the solenoid 284, a magnetic field is formed around the solenoid 284. A magnetic force is applied to some of the components of the lower plunger module 210 and some of the components of the upper plunger module 260 by the magnetic field so that the operation of opening or closing the inlet port U1 and the outlet port U2 may be controlled. The operation of opening or closing the inlet port U1 and the outlet port U2 may be controlled by equilibrium between i) a pressure of the fluid containing condensate water and gas, ii) a magnetic force applied to the lower plunger module 210 and the upper plunger module 260 by a magnetic field of the solenoid, and iii) a restoring force generated by the deformation of the elastic member 282.

Meanwhile, the upper plunger module 260 may further include a core 270 provided to be penetrated by a partial region of the upper plunger member 265. In the instant case, at least a partial region of the upper plunger member 265 may be provided to be surrounded by the solenoid 284, and at least a partial region of the core 270 may also be provided to be surrounded by the solenoid 284. In the instant case, a region of the upper plunger member 265, which is provided to penetrate the core 270, may be provided to face the solenoid 284 in a horizontal direction W with the core 270 interposed therebetween.

Meanwhile, the fluid control device 10 according to an exemplary embodiment of the present disclosure may further include components configured to fix the lower plunger module 210, the upper plunger module 260, and the solenoid 284 to the housing portion 100. The fluid control device 10 may further include a bobbin portion 300 configured to fixedly couple the lower plunger module 210, the upper plunger module 260, and the solenoid 284 to the internal surface of the housing portion 100.

The bobbin portion 300 may include a bobbin body region 310 to which the lower plunger module 210 is tightly attached, and the bobbin body region 310 may be fixedly coupled to the internal surface of the housing portion 100. As illustrated in FIG. 1, FIG. 2, and FIG. 3, an upper side of the bobbin body region 310 may be opened.

The bobbin portion 300 may further include a bobbin cover region 320 coupled to an upper portion of the bobbin body region 310 and fixedly coupled to the internal surface of the housing portion 100, and the upper plunger module 260 is tightly attached to the bobbin cover region 320.

With continued reference to FIG. 1, FIG. 2, and FIG. 3, the fluid control device 10 according to an exemplary embodiment of the present disclosure may further include a valve casing 286 provided to be tightly attached to an internal surface of the bobbin body region 310 and configured to accommodate the solenoid 284 and the core 270 therein. The solenoid 284 may be fixed to the bobbin portion 300 by the valve casing 286. Furthermore, a lower surface of an upper region of the valve casing 286 may be provided to be tightly attached to the solenoid 284 and the core 270.

Meanwhile, the upper plunger member 265 may include an upper plunger body region 265a provided above the valve casing 286, and an upper plunger extension region 265b extending downwardly from the upper plunger body region 265a and configured to penetrate an upper region of the valve casing 286 and the core 270. In the instant case, the upper plunger extension region 265b may penetrate the core 270 in the upward/downward direction H from an upper surface to a lower surface of the core 270 and then be externally exposed from the core 270. Furthermore, the elastic member 282 may be a spring. In the instant case, the spring 282 may be provided to surround a periphery of a section of the upper plunger extension region 265b that protrudes downwardly from the core 270. This may be understood as providing a structure in which a region of the upper plunger extension region 265b, which is externally exposed from the core 270, is inserted into the spring 282.

Furthermore, for example, the upper plunger extension region 265b may be fixedly coupled to the lower plunger member 215. At least a portion of a section of the upper plunger extension region 265b, which protrudes downwardly from the core 270, may be fixedly coupled to the lower plunger member 215. For example, FIG. 1, FIG. 2, and FIG. 3 illustrates a state in which a lower end portion of the upper plunger extension region 265b is inserted and coupled into the lower plunger member 215. In the instant case, a motion of the lower plunger member 215 and a motion of the upper plunger member 265 may be integrated with each other.

With continued reference to FIG. 1, FIG. 2, and FIG. 3, the lower plunger module 210 of the fluid control device 10 according to an exemplary embodiment of the present disclosure may further include a yoke member 220 provided between the valve casing 286 and the lower plunger member 215. The yoke member 220 may be configured to guide a movement of the lower plunger member 215 in the upward/downward direction H and allow the lower plunger module 210 to be more stably fixed to the bobbin portion 300 and the housing portion 100.

As illustrated in FIG. 1, FIG. 2, and FIG. 3, the yoke member 220 may include a yoke body region 220a provided to surround an external periphery of the lower plunger member 215 and configured to penetrate a lower region of the valve casing 286. The yoke body region 220a may be provided to directly face the external peripheral surface of the lower plunger member 215. Furthermore, the yoke member 220 may further include a yoke extension region 220b extending from a lower end portion of the yoke body region 220a in the horizontal direction W and provided to be tightly attached to the lower region of the valve casing 286. With reference to FIG. 1, the lower plunger member 215 may be understood as being disposed to penetrate a central region of the yoke member 220 in the upward/downward direction H.

Meanwhile, the fluid control device 10 according to an exemplary embodiment of the present disclosure may further include a diaphragm member configured to move in the upward/downward direction H in conjunction with the movements of the lower and upper plunger members 215 and 265 in the upward/downward direction H. The diaphragm member may be configured to come into direct contact with upper and lower regions of the housing portion 100 and control the operation of opening or closing the inlet port U1 and the outlet port U2. The diaphragm member may be made of a flexible material which is comparatively easily changed in shape by an external force. For example, the diaphragm member may be made of a rubber material.

The upper plunger module 260 may further include an upper diaphragm 275 provided above the valve casing 286, and an end portion of the upper diaphragm 275 based on the horizontal direction W may be provided to be tightly attached to the bobbin cover region 320. The upper plunger body region 265a may be fixedly coupled to the upper diaphragm 275. The lower plunger module 210 may further include a lower diaphragm 225 provided below the valve casing 286, and an end portion of the lower diaphragm 225 based on the horizontal direction W may be provided to be tightly attached to the bobbin body region 310. The lower plunger member 215 may be fixedly coupled to the lower diaphragm 225. For example, as illustrated in FIG. 1, FIG. 2, and FIG. 3, the upper plunger body region 265a of the upper plunger member 265 may be fixedly coupled to a central region of the upper diaphragm 275 based on the horizontal direction W, and a lower region of the lower plunger member 215 may be fixedly coupled to a central region of the lower diaphragm 225 based on the horizontal direction W.

In the instant case, according to an exemplary embodiment of the present disclosure, the region of the upper diaphragm 275, to which the upper plunger body region 265a is fixedly coupled, may be provided to be movable in the upward/downward direction H by the movement of the upper plunger member 265. In contrast, at least a portion of a region of the upper diaphragm 275, which excludes the region to which the upper plunger body region 265a is fixedly coupled, may be provided to be fixed by the valve casing 286 and the bobbin cover region 320.

Furthermore, the region of the lower diaphragm 225, to which the lower plunger member 215 is fixedly coupled, may be provided to be movable in the upward/downward direction H by the movement of the lower plunger member 215. In contrast, at least a part of a region of the lower diaphragm 225, which excludes the region to which the lower plunger member 215 is fixedly coupled, may be provided to be fixed by the yoke extension region 220b and the bobbin body region 310. Meanwhile, for example, FIG. 1, FIG. 2, and FIG. 3 illustrate a state in which the upper diaphragm 275 includes a shape convex upward based on the region of the upper diaphragm 275 fixedly coupled to the upper plunger body region 265a and a state in which the lower diaphragm 225 includes a shape convex downward based on the region of the lower diaphragm 225 fixedly coupled to the lower plunger member 215.

Meanwhile, the lower plunger module 210 and the upper plunger module 260 may each further include components configured to support at least a partial region of the lower diaphragm 225 and at least a partial region of the upper diaphragm 275.

The lower plunger module 210 may further include a lower support plate 230 provided to be tightly attached to a lower surface of the yoke extension region 220b and an internal surface of the lower diaphragm 225 and configured to support a peripheral region of the region of the lower diaphragm 225 to which the lower plunger member 215 is fixedly coupled. Furthermore, the upper plunger module 260 may further include an upper support plate 280 provided to be tightly attached to an upper surface of the upper region of the valve casing 286 and an internal surface of the upper diaphragm 275 and configured to support a peripheral region of the region of the upper diaphragm 275 to which the upper plunger body region 265a is fixedly coupled. Therefore, the lower support plate 230 may restrict a movement in the upward/downward direction H of the region of the lower diaphragm 225, which excludes the region to which the lower plunger member 215 is fixedly coupled, within a predetermined range. The upper support plate 280 may restrict a movement in the upward/downward direction H of the region of the upper diaphragm 275, which excludes the region to which the upper plunger member 265 is fixedly coupled, within a predetermined range.

As described above, the fluid control device 10 according to an exemplary embodiment of the present disclosure may be configured for controlling the operation of opening or closing the inlet port U1 and the outlet port U2 by controlling the electric current that flows to the solenoid 284. When the electric current flows to the solenoid 284, the magnetic field is changed around the solenoid 284. Therefore, at least some of the components of the lower and upper plunger modules 210 and 260 are magnetized so that a force for pulling some of the components of the lower plunger module 210 and some of the components of the upper plunger module 260 toward one another, i.e., an attractive force is applied between some of the components of the lower plunger module 210 and some of the components of the upper plunger module 260.

The attractive force may be applied between the lower plunger member 215 and the core 270. Therefore, according to an exemplary embodiment of the present disclosure, the lower plunger member 215 and the core 270 may each include a magnetic material or be made of a magnetic material.

Meanwhile, according to another example of the present disclosure, the yoke member 220 may also include a magnetic material or be made of a magnetic material. In the instant case, the attractive force is applied between the core 270 and the lower plunger member 215 and between the core 270 and the yoke member 220.

In contrast, a degree to which the upper plunger member 265 is magnetized by an external magnetic field may be relatively lower than a degree to which the core 270 is magnetized. This is to minimize a degree to which the attractive force is applied between the upper plunger member 265 and the core 270 in a direction in which the attractive force between the upper plunger member 265 and the core 270 cancels the attractive force between the lower plunger member 215 and the core 270 or prevent the attractive force from being applied between the upper plunger member 265 and the core 270 in the direction in which the attractive force between the upper plunger member 265 and the core 270 cancels the attractive force between the lower plunger member 215 and the core 270. That is, as illustrated in FIG. 1, because the upper plunger body region 265*a* of the upper plunger member 265 is provided in an upper region of the core 270, the above-mentioned configuration is provided to minimize a degree to which an upward force is applied to the core 270 by the upper plunger body region 265*a* as the upper plunger body region 265*a* is strongly magnetized by the magnetic field generated by the solenoid 284. Therefore, according to an exemplary embodiment of the present disclosure, a degree of magnetization of a material of the upper plunger member 265 may be lower than a degree of magnetization of a material of the lower plunger member 215 and a degree of magnetization of a material of the core 270.

With continued reference to FIG. 1, FIG. 2, and FIG. 3, the core 270 may be divided into a plurality of regions. The core 270 may include a core body region 270*a* provided to be tightly attached to the lower surface of the upper region of the valve casing 286, and a downward protrusion region 270*b* extending downwardly from the core body region 270*a* and provided to surround an external periphery of at least a partial region of the lower plunger member 215. For example, a lower end portion of the downward protrusion region 270*b* may include a pointy vertical cross-sectional shape. With reference to FIG. 1, FIG. 2, and FIG. 3, the downward protrusion region 270*b* may be understood as including a shape similar to a conical shape in which an approximately center portion thereof is empty. An upper end portion region of the lower plunger member 215 may be understood as being disposed in the empty central region of the conical shape.

As described below, the fluid control device 10 according to an exemplary embodiment of the present disclosure may implement i) a state in which the inlet port U1 is closed and the outlet port U2 is opened, ii) a state in which the inlet port U1 is opened and the outlet port U2 is closed, and iii) a state in which both the inlet port U1 and the outlet port U2 are opened. Therefore, to implement the iii) state, the attractive force between the lower plunger member 215 and the core 270 needs to be precisely controlled. The downward protrusion region 270*b* may be a component that enables the attractive force between the lower plunger member 215 and the core 270 to be more precisely controlled. That is, according to an exemplary embodiment of the present disclosure, in addition to the attractive force between the core body region 270*a* and the lower plunger member 215, an attractive force is additionally applied between the downward protrusion region 270*b* and the lower plunger member 215 so that the attractive force between the lower plunger member 215 and the core 270 may be more precisely controlled.

Meanwhile, protrusion regions may be provided on the housing portion 100 and disposed in the vicinity of the inlet port U1 and the outlet port U2, and the protrusion regions protrude toward the internal space S of the housing portion 100. As illustrated in FIG. 1, FIG. 2, and FIG. 3, the housing portion 100 may include an inlet protrusion region 110 protruding downwardly from a lower surface of the upper region of the housing portion 100 and configured to interfere with the upper diaphragm 275 when the upper diaphragm 275 moves upward with a predetermined distance. The inlet protrusion region 110 may be formed along a periphery of the inlet port U1 and provided to face the upper diaphragm 275 in the upward/downward direction H. Therefore, when the upper diaphragm 275 moves upward with a predetermined distance, the upper diaphragm 275 may come into contact with the inlet protrusion region 110 so that the inlet port U1 may be closed. The region of the upper plunger member 265, which is fixedly coupled to the upper diaphragm 275, may be provided to face the inlet protrusion region 110 in the upward/downward direction H with the upper diaphragm 275 interposed therebetween.

Furthermore, the housing portion 100 may further include an outlet protrusion region 120 protruding from an upper surface of the lower region of the housing portion 100 and configured to interfere with the lower diaphragm 225 when the lower diaphragm 225 moves downward with a predetermined distance. The outlet protrusion region 120 may be formed along a periphery of the outlet port U2 and provided to face the lower diaphragm 225 in the upward/downward direction H. Therefore, when the lower diaphragm 225 moves downward with a predetermined distance, the lower diaphragm 225 may come into contact with the outlet protrusion region 120 so that the outlet port U2 may be closed. The region of the lower plunger member 215, which is fixedly coupled to the lower diaphragm 225, may be provided to face the outlet protrusion region 120 in the upward/downward direction H with the lower diaphragm 225 interposed therebetween.

Meanwhile, the fluid control device 10 according to an exemplary embodiment of the present disclosure may be controlled to implement i) a state in which the inlet port U1 fluidically-communicates with the internal space S, whereas the outlet port U2 is closed with respect to the internal space S, ii) a state in which the inlet port U1 is closed with respect to the internal space S, whereas the outlet port U2 fluidically-communicates with the internal space S2, and iii) a state in which both the inlet port U1 and the outlet port U2 fluidically-communicate with the internal space S. Therefore, to control the fluid control device 10 according to an exemplary embodiment of the present disclosure to implement the iii) state, a lower surface of the core body region 270*a* and an upper end portion of the lower plunger member 215 may be spaced from each other in the upward/downward direction H in a state in which no electric current flows to the solenoid 284, as illustrated in FIG. 1, FIG. 2, and FIG. 3. In the instant case, as illustrated in FIG. 1, FIG. 2, and FIG. 3, in the state in which no electric current flows to the solenoid 284, the lower diaphragm 225 comes into contact with the outlet protrusion region 120 so that the outlet port U2 is closed. When the electric current flows to the solenoid 284 in the state in which the inlet port U1 is opened, the lower plunger member 215 is moved upward by the attractive force between the lower plunger member 215 and the core 270 so that a section is generated in which the lower diaphragm 225 moves upward and the upper diaphragm 275 moves relatively less upwards. Therefore, it is possible to implement a state in which the inlet port U1 is kept in the opened state, and the outlet port U2 is also kept in the opened state.

Meanwhile, according to an exemplary embodiment of the present disclosure, a configuration with a hole, which fluidically-communicates the with the outside thereof, may be additionally formed in the housing portion 100 and the bobbin portion 300, in addition to the inlet port U1 and the outlet port U2. As illustrated in FIG. 1, FIG. 2, and FIG. 3, a vent hole V may be formed in a portion of a region in which the housing portion 100 and the bobbin body region 310 are tightly attached, and the vent hole V may be formed through the housing portion 100 and the bobbin body region 310. The vent hole V may be configured to allow an empty space, which is formed in the region in which the lower diaphragm 225 and the upper diaphragm 275 are tightly attached to the bobbin portion 300, to fluidically-communicate with an external space of the fluid control device 10. Therefore, even though a fluid (e.g., hydrogen with a small magnitude), which is introduced into the internal space S of the housing portion 100, permeates into the region, in which the lower diaphragm 225 and the upper diaphragm 275 are tightly attached to the bobbin portion 300, during a process of operating the fluid control device 10, the vent hole allows the fluid to exit to the external space, ensuring sealability in the regions in which the lower diaphragm 225 and the upper diaphragm 275 are fixed.

However, even though the vent hole V is formed, the internal space S of the housing portion 100 needs to be kept in a sealed state from the external space. To the present end, the fluid control device 10 may further include a sealing member 600 formed around the vent hole V in the region in which the internal surface of the housing portion 100 and the bobbin body region 310 are tightly attached to each other. For example, the sealing member 600 may be a gasket.

With continued reference to FIG. 1, FIG. 2, and FIG. 3, the fluid control device 10 may further include a heater member 400 provided in the vicinity of the outlet port U2 and configured to generate heat. The heater member 400 may be provided in the lower region of the housing portion 100 and fixedly coupled to a lower surface of the outlet protrusion region 120 that surrounds the outlet port U2. The heater member 400 may be an electric heating member that generates heat by being supplied with electric power. The heater member 400 may be configured to prevent freezing which may occur in the vicinity of the outlet port U2.

Furthermore, the fluid control device 10 according to an exemplary embodiment of the present disclosure may further include a pressure sensor 500 provided at one side of the housing portion 100 and configured for measuring a pressure in the internal space S of the housing portion 100. It is possible to identify physical properties of gases in the housing portion 100 based on the pressure measured by the pressure sensor 500.

Meanwhile, as described above, not only the hydrogen-containing gas discharged from the fuel cell may be introduced into the fluid control device 10, but also the condensate water discharged from the fuel cell may be introduced into the fluid control device 10. The condensate water introduced into the internal space S of the housing portion 100 is collected in the lower region of the housing portion 100 by gravity.

In the instant case, to allow the pressure sensor 500 to smoothly perform the natural function of measuring the pressure of the gas, the pressure sensor 500 may be provided at a height at which the pressure sensor 500 is not immersed in the condensate water. For example, the pressure sensor 500 may be provided above an upper end portion of the outlet protrusion region 120. The pressure sensor 500 may be provided in a central region of the housing portion 100 based on the upward/downward direction H or provided above the central region.

Meanwhile, according to an exemplary embodiment of the present disclosure, the fluid control device 10 may further include a buffer member to mitigate an impact applied by a motion of the lower plunger member 215 in the upward/downward direction H and a motion of the assembly of the upper plunger member 265 and the core 270 in the upward/downward direction H. The fluid control device 10 may further include dampers 288 provided in i) a region in which the upper surface of the upper region of the valve casing 286 and the upper plunger member 265 face each other, and ii) a region in which the lower surface of the yoke extension region 220b and the lower plunger member 215 face each other. The damper 288 may be made of a material configured for absorbing an impact caused by an external force.

Furthermore, the fluid control device 10 may further include a film member 700 provided between an internal surface of the yoke body region 220a and an external surface of the lower plunger member 215. The yoke member 220 is fixed to respect to the housing portion 100 during the process in which the fluid control device 10 is operated by the magnetic field generated by the solenoid 284, whereas the lower plunger member 215 moves in the upward/downward direction H relative to the housing portion 100. In the instant case, the film member 700 may be configured to reduce a frictional force between the lower plunger member 215 and the yoke member 220 and allow the lower plunger member 215 to smoothly move relative to the yoke member 220.

Hereinafter, a method of controlling the fluid control device according to an exemplary embodiment of the present disclosure will be described with reference to the above-mentioned description and the configuration illustrated in the drawings.

Method of Controlling Fluid Control Device

Figure 4:
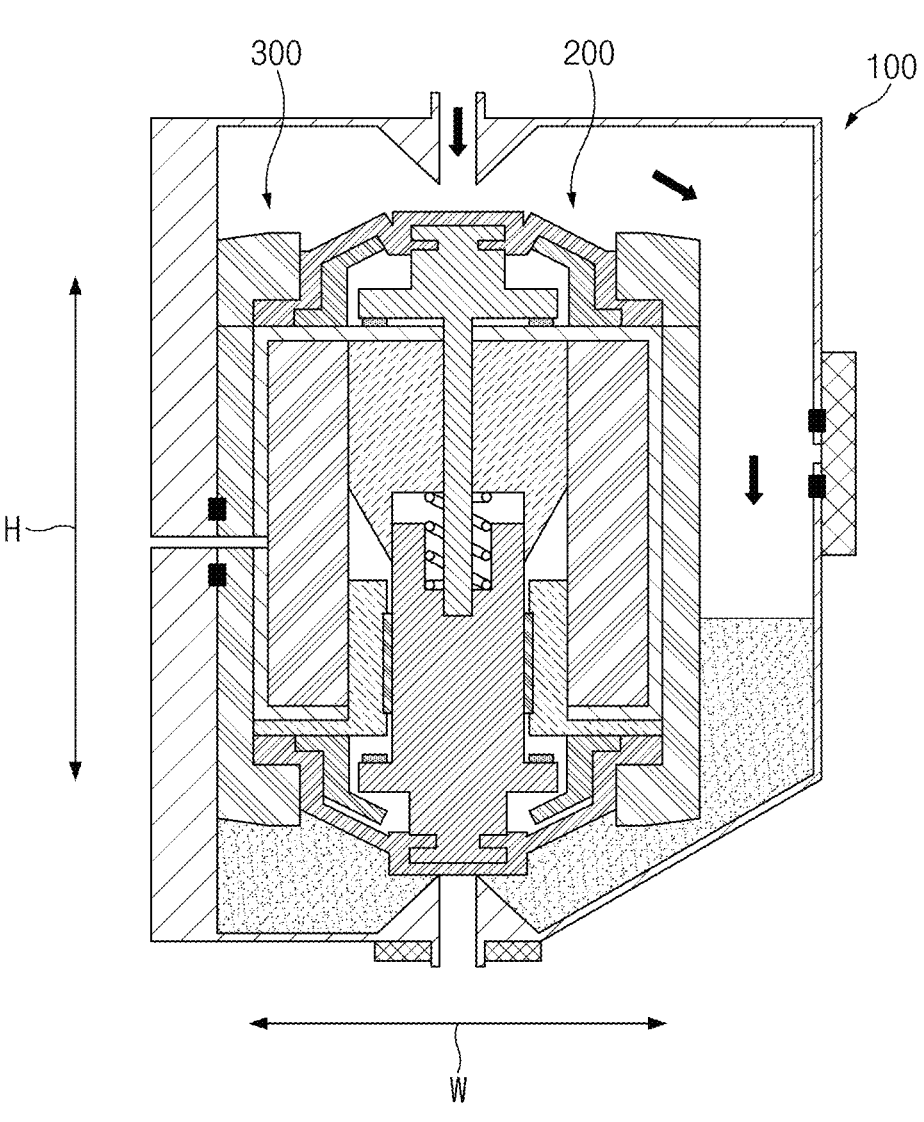
FIG. 4 is a view exemplarily illustrating a flow of a fluid in an outlet port sealing step of a method of controlling the fluid control device according to an exemplary embodiment of the present disclosure.

The method of controlling the fluid control device according to an exemplary embodiment of the present disclosure may include an outlet port sealing step in which in a state in which no electric current flows to the solenoid 284, the lower plunger module 210 is tightly attached to the lower region of the housing portion 100 to seal the internal space S of the housing portion 100 with respect to the outlet port U2, and the upper plunger module 260 is spaced from the upper region of the housing portion 100. With reference to FIGS. 1 and 4, in the outlet port sealing step, the hydrogen-containing gas and the condensate water, which are discharged from the fuel cell, may be introduced into the internal space S of the housing portion 100 through the inlet port U1.

Figure 5:
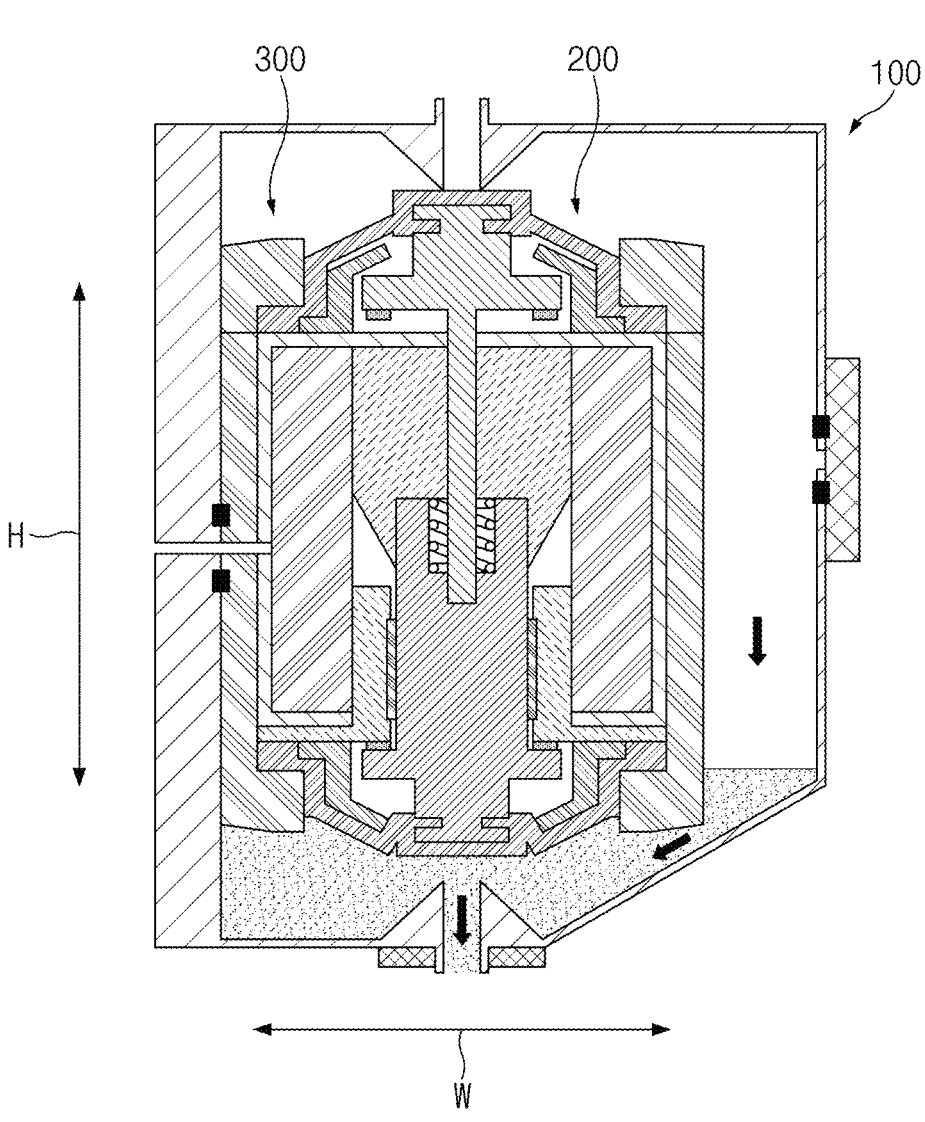
FIG. 5 is a view exemplarily illustrating a flow of the fluid in an inlet port sealing step of the method of controlling the fluid control device according to an exemplary embodiment of the present disclosure.

Furthermore, the method of controlling the fluid control device may further include an inlet port sealing step in which in a state in which a first electric current flows to the solenoid 284, the upper plunger module 260 moves to the upper region of the housing portion 100 to seal the internal space S of the housing portion 100 with respect to the inlet port U1, and the lower plunger module 210 is spaced from the lower region of the housing portion 100. With reference to FIGS. 2 and 5, in the inlet port sealing step, the hydrogen-containing gas and the condensate water, which are stored in the internal space S of the housing portion 100 in the outlet port sealing step, may be discharged to the outside through the outlet port U2. In the instant case, because the condensate water is stored in a lower space of the internal space S of the housing portion 100 by gravity, the condensate water may begin to be discharged to the outside through the outlet port U2 first before the hydrogen-containing gas is discharged in the inlet port sealing step.

Furthermore, the method of controlling the fluid control device may further include a simultaneous opening step in which when a second electric current lower than the first electric current flows to the solenoid 284, the lower plunger module 210 is spaced from the lower region of the housing portion 100 in the state in which the upper plunger module 260 is spaced from the upper region of the housing portion 100 so that the inlet port U1, the outlet port U2, and the internal space S of the housing portion 100 fluidically-communicate with one another. With reference to FIG. 3, in the simultaneous opening step, the condensate water and the gas, which are discharged from the fuel cell, may be discharged to the outside through the outlet port U2 immediately after the condensate water and the gas are introduced into the internal space S of the housing portion 100 through the inlet port U1. In the simultaneous opening step, because a width of a flow path through which the fluid flows is small in the vicinity of the outlet port U2, a venture effect of reducing a pressure may occur. Therefore, the condensate water, which is stored in the lower region of the housing portion 100 by gravity, may be moved upward by a pressure difference and then discharged to the outside through the outlet port U2. The simultaneous opening step may be performed in a state in which the fuel cell is subjected to cold shutdown in a state in which the operation of the fuel cell ends or a low-temperature state in which there is a risk of freezing. During a typical process of operating the fuel cell, the outlet port sealing step and the inlet port sealing step may be alternately performed.

Figure 6:
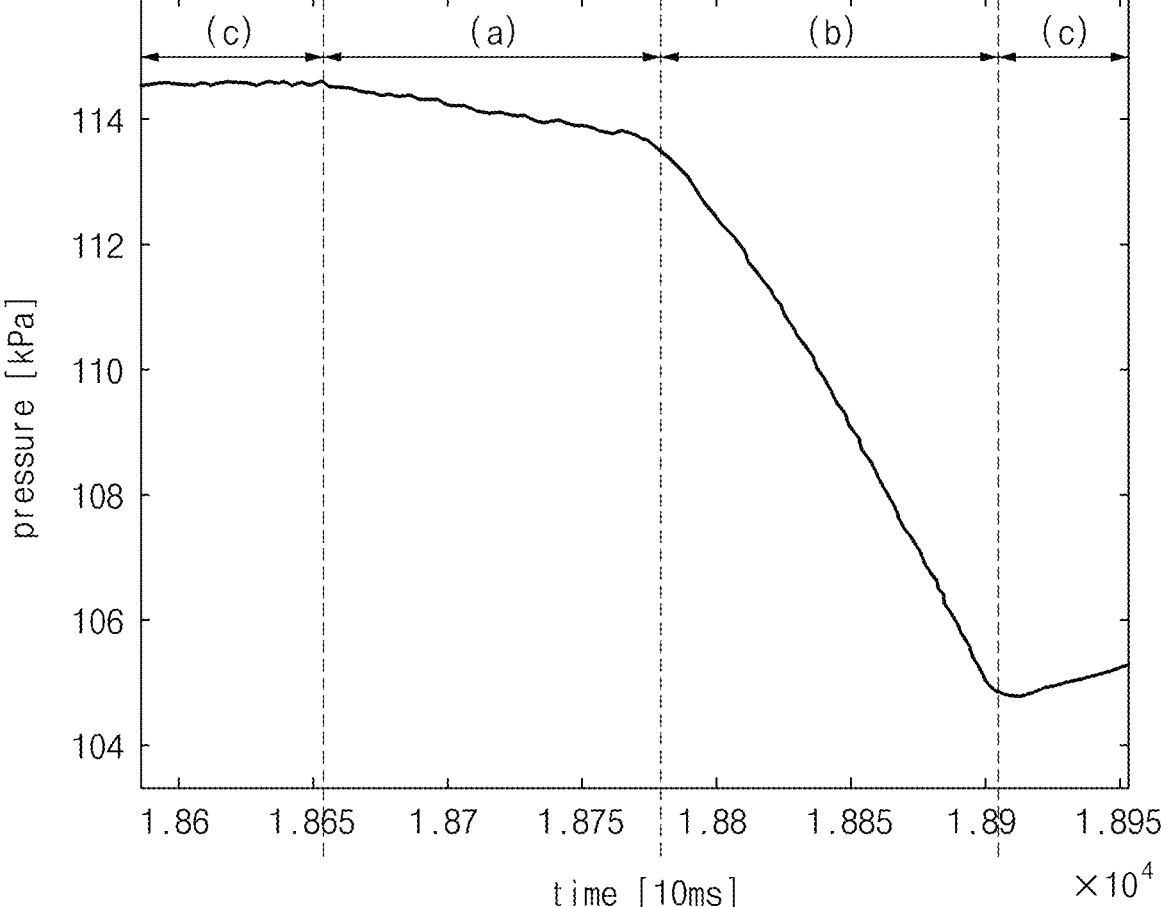
FIG. 6 is a graph illustrating a change in pressure in an internal space of a housing part over time when the method of controlling the fluid control device according to an exemplary embodiment of the present disclosure is applied.

FIG. 6 is a graph illustrating a change in pressure in the internal space of the housing portion over time when the method of controlling the fluid control device according to an exemplary embodiment of the present disclosure is applied.

In FIG. 6, sections (a) and (b) may indicate changes in pressure in the internal space of the housing portion in the inlet port sealing step of the method of controlling the fluid control device according to an exemplary embodiment of the present disclosure. section (a) refers to a section in which the condensate water, which is stored in the lower region of the internal space of the housing portion, is discharged through the outlet port first. Because the hydrogen-containing gas is not discharged in the present section, the pressure in the internal space of the housing portion slowly decreases.

Section (b) refers to a section in which the hydrogen-containing gas is discharged through the outlet port. Because the gas is discharged in the present section, the pressure in the internal space of the housing portion rapidly decreases.

Meanwhile, section (c) may indicate a change in pressure in the internal space of the housing portion in the outlet port sealing step of the method of controlling the fluid control device according to an exemplary embodiment of the present disclosure. Because the inlet port U1 is opened in section (c), the internal space of the housing portion follows the pressure in a fuel electrode (i.e., anode) of the fuel cell so that the pressure in the internal space of the housing portion increases over time.

Meanwhile, the method of controlling the fluid control device according to an exemplary embodiment of the present disclosure may further include a purge flow rate calculation step in which a change in pressure over time in the housing portion, in which the inlet port sealing step is performed, is measured, and the amount of gas and condensate water, which are discharged from the interior of the housing portion in the inlet port sealing step, is calculated based on a time point at which a rate (dP/dt) of change in pressure over time in the housing portion exceeds a predetermined magnitude when the dP/dt exceeds the predetermined magnitude.

The condensate water may be mainly discharged from the internal space of the housing portion in section (a) in FIG. 6, and the gas may be mainly discharged from the internal space of the housing portion in section (b) in FIG. 6. In the instant case, in the inlet port sealing step, a boundary between the section in which the condensate water is mainly discharged and the section in which the gas is mainly discharged may be estimated as a boundary between sections (a) and (b) in FIG. 6, i.e., the time point at which the rate (dP/dt) of change in pressure over time exceeds the predetermined magnitude, in other words, the time point at which the magnitude of the dP/dt rapidly changes. Therefore, in the purge flow rate calculation step, based on the boundary between sections (a) and (b) in FIG. 6, it is possible to determine i) the amount of discharge of the condensate water based on the change in pressure in section (a), and determine ii) the amount of discharge of the gas based on the change in pressure in section (b).

Meanwhile, an example of a method of manufacturing the fluid control device 10 according to an exemplary embodiment of the present disclosure will be described with reference to the above-mentioned description.

Method of Manufacturing Fluid Control Device

Figure 7:
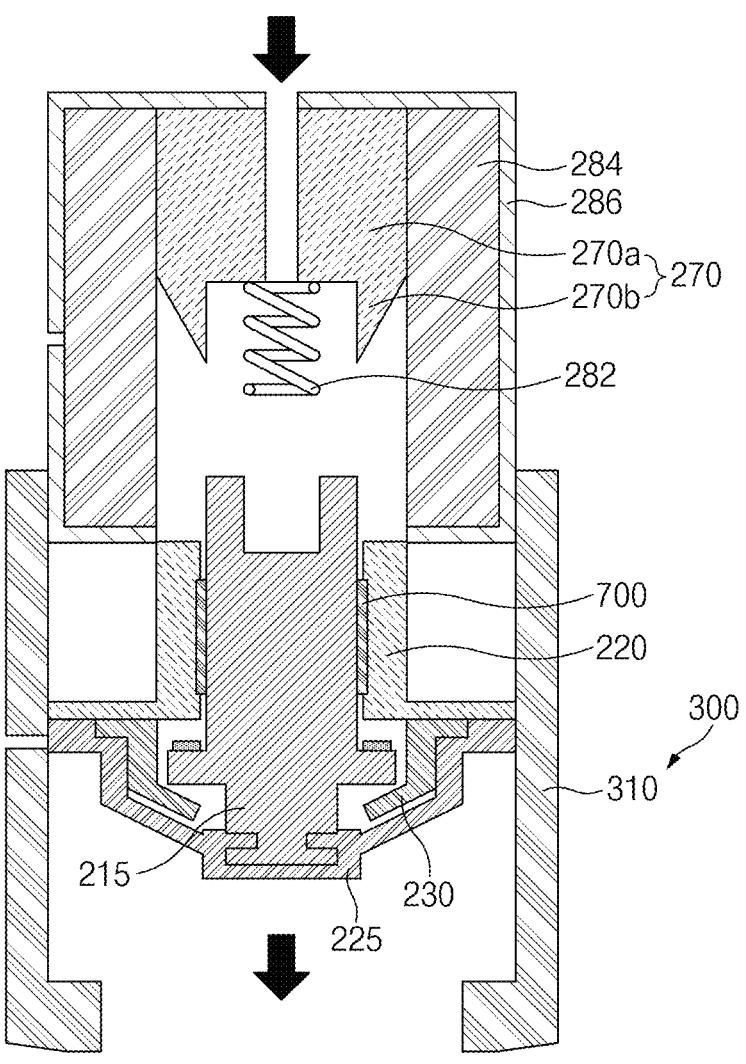
FIG. 7 is a view for explaining a first step, a second step, a third step, and a fourth step of a method of manufacturing the fluid control device according to an exemplary embodiment of the present disclosure.
Figure 8:
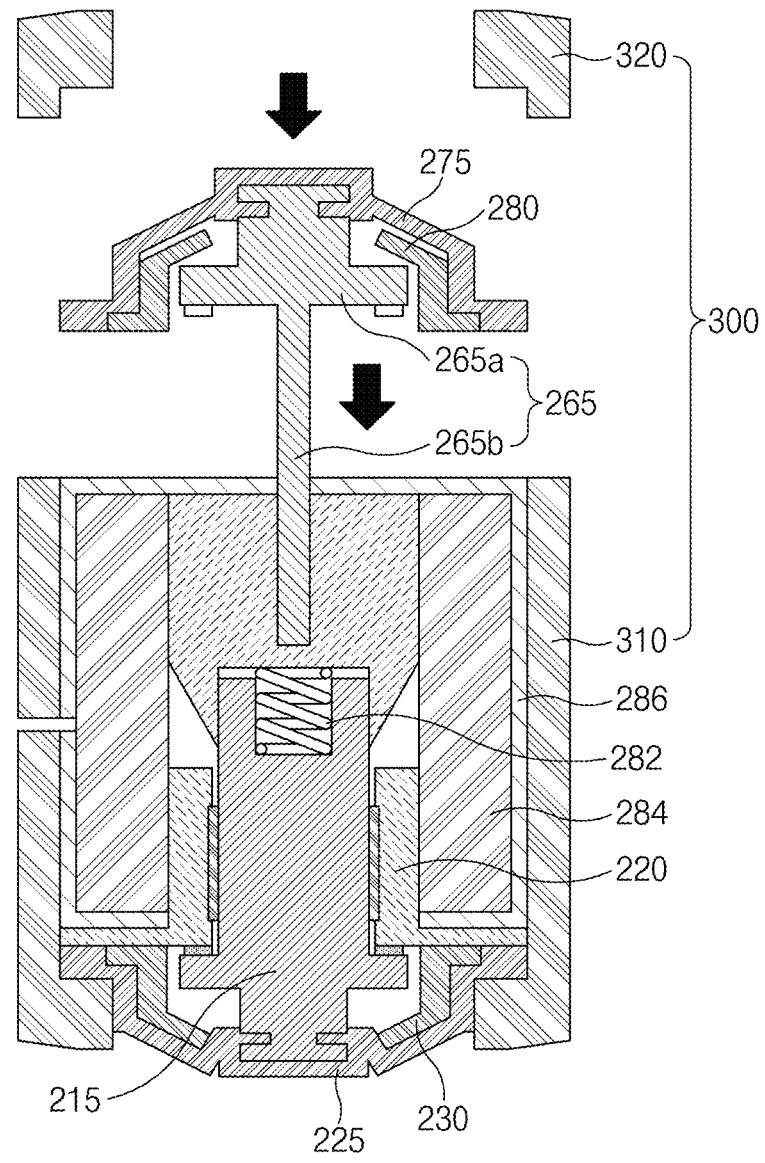
FIG. 8 is a view for explaining a fifth step of the method of manufacturing the fluid control device according to an exemplary embodiment of the present disclosure.
Figure 9:
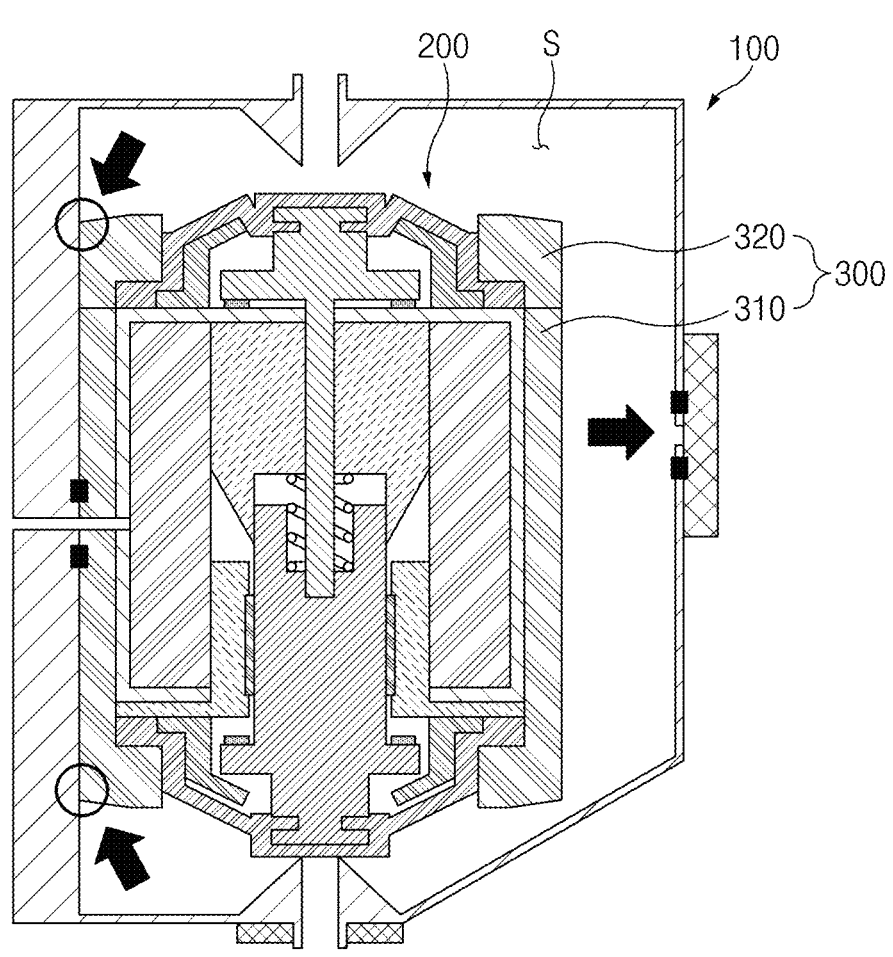
FIG. 9 is a view for explaining a sixth step of the method of manufacturing the fluid control device according to an exemplary embodiment of the present disclosure.

FIG. 7 is a view for explaining a first step, a second step, a third step, and a fourth step of a method of manufacturing the fluid control device according to an exemplary embodiment of the present disclosure, and FIG. 8 is a view for explaining a fifth step of the method of manufacturing the fluid control device according to an exemplary embodiment of the present disclosure. FIG. 9 is a view for explaining a sixth step of the method of manufacturing the fluid control device according to an exemplary embodiment of the present disclosure.

With reference to FIG. 7, a method of manufacturing the fluid control device according to an exemplary embodiment of the present disclosure may include i) a first step of manufacturing a first assembly structure including a structure in which the solenoid 284, the core 270, and the elastic member 282 are assembled in the valve casing 286, ii) a second step of manufacturing a second assembly structure including a structure in which the lower plunger member 215, the yoke member 220, the lower diaphragm 225, the lower support plate 230, and the film member 700 are assembled, and iii) a third step of coupling the first assembly structure to the second assembly structure. In the third step, the upper region of the lower plunger member 215 may be surrounded by the downward protrusion region 270b of the core 270. Furthermore, with continued reference to FIG. 7, the method of manufacturing the fluid control device may further include a fourth step of accommodating an assembly, which is made by coupling the first assembly structure and the second assembly structure, in the bobbin body region 310.

Furthermore, as illustrated in FIG. 8, the method of manufacturing the fluid control device according to an exemplary embodiment of the present disclosure may further include a fifth step of disposing the upper plunger member 265, the upper diaphragm 275, and the upper support plate 280 in the upper region of the bobbin body region 310 and fastening the bobbin cover region 320 to the upper region of the bobbin body region 310. In the fifth step, the upper plunger extension region 265b of the upper plunger member 265 may be penetratively inserted into the core body region 270a. In the fifth step, a coupled body may be manufactured by coupling the valve portion 200 and the bobbin portion 300.

Meanwhile, as illustrated in FIG. 9, the method of manufacturing the fluid control device may further include a sixth step of accommodating the coupled body, which is assembled in the fifth step by coupling the valve portion 200 and the bobbin portion 300, in the internal space S of the housing portion 100 and fixedly coupling the coupled body to the internal surface of the housing portion 100. In the sixth step, the bobbin body region 310 and the bobbin cover region 320 of the bobbin portion 300 may be fastened to the internal surface of the housing portion 100. Finally, the method of manufacturing the fluid control device may further include a seventh step of sealing the internal space S of the housing portion 100 by placing a cover in the opened region of the housing portion 100.

Meanwhile, the amount of gas purged from the fuel cell may be measured based on the ideal gas equation by use of the fluid control device according to an exemplary embodiment of the present disclosure with reference to the above-mentioned description and the configuration illustrated in the drawings. That is, by use of PV=nRT (P represents pressure, V represents volume, n represents the number of moles, T represents temperature, and R represents gas constant), n1, which is the number of moles of the gas in the internal space of the housing portion, is calculated at a time point, at which the inlet port U1 is closed and the outlet port U2 begins to be opened, and n2, which is the number of moles of the gas in the internal space of the housing portion, is calculated at a time point at which the inlet port U1 is opened again and the outlet port U2 begins to be closed after the outlet port U2 is opened and the condensate water and the gas are discharged. Furthermore, a difference in value between n1 and n2 may be measured so that the number of moles of the purged gas may be measured, and the volume of the purged gas may also be measured.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A fluid control apparatus comprising:
    a housing portion including an inlet port through which a fluid is introduced from an outside of the housing portion, an outlet port through which the fluid is discharged to the outside of the housing portion, and an internal space configured to fluidically-communicate with the inlet port and the outlet port; and
    a valve portion accommodated in the internal space of the housing portion and including one side fixedly coupled to an internal surface of the housing portion,
    wherein the valve portion includes:
        a lower plunger module;
        an upper plunger module provided above the lower plunger module; and
        a solenoid provided to surround a partial region of the upper plunger module and a partial region of the lower plunger module,
    wherein the lower plunger module includes a lower plunger member movable in a first direction relative to the housing portion, and
    wherein the upper plunger module includes:
        an upper plunger member movable in the first direction relative to the housing portion and including at least a partial region surrounded by the solenoid; and
        a core including at least a partial region surrounded by the solenoid,
    wherein the fluid control apparatus further including:
        a bobbin portion fixedly coupling the lower plunger module, the upper plunger module, and the solenoid to the internal surface of the housing portion.

2. The fluid control apparatus of claim 1, wherein the valve portion further
    includes an elastic member mounted between the lower plunger module and the upper plunger module and including a first side pressing the lower plunger module downward, and a second side pressing the upper plunger module upwards.

3. The fluid control apparatus of claim 2,
    wherein the bobbin portion includes:
        a bobbin body region to which the lower plunger module is attached, the bobbin body region being opened at an upper side thereof and fixedly coupled to the internal surface of the housing portion; and
        a bobbin cover region to which the upper plunger module is attached, the bobbin cover region being coupled to an upper portion of the bobbin body region and fixedly coupled to the internal surface of the housing portion.

4. The fluid control apparatus of claim 3, further including:
    a valve casing attached to an internal surface of the bobbin body region and accommodating the solenoid and the core therein.

5. The fluid control apparatus of claim 4,
    wherein a lower surface of an upper region of the valve casing is attached to the solenoid and the core, and
    wherein the upper plunger member includes:
        an upper plunger body region disposed above the valve casing; and an upper plunger extension region extending downwardly from the upper plunger body region and penetrating the upper region of the valve casing and the core.

6. The fluid control apparatus of claim 5, wherein the elastic member is a spring, and the spring is mounted to surround a periphery of a section of the upper plunger extension region that protrudes downwardly from the core.

7. The fluid control apparatus of claim 6, wherein at least a portion of the section of the upper plunger extension region, which protrudes downwardly from the core, is fixedly coupled to the lower plunger member.

8. The fluid control apparatus of claim 5, wherein the upper plunger module further includes an upper diaphragm to which the upper plunger body region is fixedly coupled, the upper diaphragm mounted above the valve casing and including an end portion defined based on a second direction and attached to the bobbin cover region.

9. The fluid control apparatus of claim 8, wherein the upper plunger module further includes an upper support plate attached to an upper surface of the upper region of the valve casing and an internal surface of the upper diaphragm and supporting a peripheral region of a region of the upper diaphragm to which the upper plunger body region is fixedly coupled.

10. The fluid control apparatus of claim 8, wherein the housing portion includes an inlet protrusion region protruding downwardly from a lower surface of an upper region of the housing portion and configured to interfere with the upper diaphragm in a state that the upper diaphragm moves upward with a predetermined distance, and wherein the inlet protrusion region is formed along a periphery of the inlet port.

11. The fluid control apparatus of claim 4, wherein the lower plunger module further includes a yoke member mounted between the valve casing and the lower plunger member, and wherein the yoke member includes:

a yoke body region surrounding an external periphery of the lower plunger member and penetrating a lower region of the valve casing; and a yoke extension region extending in a second direction from a lower end portion of the yoke body region and attached to the lower region of the valve casing.

12. The fluid control apparatus of claim 11, wherein the lower plunger module further includes a lower diaphragm to which the lower plunger member is fixedly coupled, the lower diaphragm being mounted below the valve casing and including an end portion defined based on the second direction and attached to the bobbin body region.

13. The fluid control apparatus of claim 12, wherein the lower plunger module further includes a lower support plate attached to a lower surface of the yoke extension region and an internal surface of the lower diaphragm and supporting a peripheral region of a region of the lower diaphragm to which the lower plunger member is fixedly coupled.

14. The fluid control apparatus of claim 12, wherein the housing portion includes an outlet protrusion region protruding upwards from an upper surface of a lower region of the housing portion and configured to interfere with the lower diaphragm in a state that the lower diaphragm moves downward with a predetermined distance, and wherein the outlet protrusion region is formed along a periphery of the outlet port.

15. The fluid control apparatus of claim 11, wherein the yoke member includes a magnetic material.

16. The fluid control apparatus of claim 4, wherein the core includes:

a core body region attached to a lower surface of an upper region of the valve casing; and a downward protrusion region extending downwardly from the core body region and surrounding an external periphery of at least a partial region of the lower plunger member.

17. The fluid control apparatus of claim 16, wherein a lower surface of the core body region and an upper end portion of the lower plunger member are spaced from each other in the first direction.

18. The fluid control apparatus of claim 3, wherein a vent hole, which is formed through the housing portion and the bobbin body region, is formed in a portion of a region in which the housing portion and the bobbin body region are attached to each other.

19. The fluid control apparatus of claim 1, wherein the lower plunger member and the core include a magnetic material.

20. A fluid control apparatus comprising:

a housing portion including an inlet port through which a fluid is introduced from an outside of the housing portion, an outlet port through which the fluid is discharged to the outside of the housing portion, and an internal space configured to fluidically-communicate with the inlet port and the outlet port; and a valve portion accommodated in the internal space of the housing portion and including one side fixedly coupled to an internal surface of the housing portion, wherein the valve portion includes:

a lower plunger module;

an upper plunger module provided above the lower plunger module; and a solenoid provided to surround a partial region of the upper plunger module and a partial region of the lower plunger module, wherein the lower plunger module includes a lower plunger member movable in a first direction relative to the housing portion, and wherein the upper plunger module includes:

an upper plunger member movable in the first direction relative to the housing portion and including at least a partial region surrounded by the solenoid; and a core including at least a partial region surrounded by the solenoid, wherein the lower plunger member and the core include a magnetic material, and wherein a degree of magnetization of a material forming the upper plunger member is lower than a degree of magnetization of a material forming the lower plunger member and a degree of magnetization of a material forming the core.

* * * * *